United States Patent [19]

Gerdt

[11] Patent Number: 5,026,984
[45] Date of Patent: Jun. 25, 1991

[54] METHODS FOR SENSING TEMPERATURE, PRESSURE AND LIQUID LEVEL AND VARIABLE RATIO FIBER OPTIC COUPLER SENSORS THEREFOR

[75] Inventor: David W. Gerdt, Charlottesville, Va.

[73] Assignee: Sperry Marine, Inc., Charlottesville, Va.

[21] Appl. No.: 465,710

[22] Filed: Jan. 16, 1990

[51] Int. Cl.[5] .................................................. H01J 5/16
[52] U.S. Cl. ............................. 250/227.21; 250/231.19
[58] Field of Search ...................... 250/227.14, 227.24, 250/227.21, 231.19; 350/96.29; 374/161, 162

[56] References Cited

U.S. PATENT DOCUMENTS

| | | | |
|---|---|---|---|
| 4,634,858 | 1/1987 | Gerdt et al. | 250/227.14 |
| 4,895,423 | 1/1990 | Bilodeau et al. | 250/227.14 |
| 4,932,263 | 6/1990 | Wlodarczyk | 250/231.19 |

*Primary Examiner*—Daivd C. Nelms
*Attorney, Agent, or Firm*—Seymour Levine

[57] ABSTRACT

Temperature, pressure and liquid level parameters are sensed by the variable ratio fiber optic coupler sensor wherein the optical coupling ratio varies in accordance with stress applied to the coupler encapsulant resulting from application of the parameter being sensed. Such use of the coupler sensor is particularly advantageous in fuel tanks, which are subject to spark hazard. Vertical arrays of such sensors are utilized to determine levels of liquids in such fuel tanks. Various sensor configurations are disclosed.

14 Claims, 4 Drawing Sheets

METHODS FOR SENSING TEMPERATURE, PRESSURE AND LIQUID LEVEL AND VARIABLE RATIO FIBER OPTIC COUPLER SENSORS THEREFOR

BACKGROUND OF THE INVENTION

1. Field of the Invention

The invention relates to sensing temperature, pressure and levels of liquids with particular application to fuel tanks. The invention further involves remote sensing of such physical phenomena if required.

2. Description of the Prior Art

There are environments wherein it is desirable to sense various physical parameters such as pressure, temperature, or liquid level where electrically based sensors or sensors containing metal may present a hazard from sparks. For example, it is often desirable to sense such parameters in fuel or other tanks where volatile fluids or gases are present. Sensors for use in such tanks should be non-electrical, non-static, non-spark producing and non-conducting. Such sensors should also accurately measure the desired parameter, be of rugged construction and be relatively inexpensive. Specifically, it is desirable to measure such parameters in marine vessel fuel tanks. Fires in large oil tankers have been caused by malfunctioning or damaged electrical temperature and pressure sensors in the fuel tanks thereof.

Measurement of pressure provides data from which the fuel level in the tank can be derived. One pressure sensor can measure liquid height in a tank if the liquid density is known. Two sensors are required for liquid level measurement if the density is unknown. The levels of two immiscible fluids in a tank can be measured by a string of pressure sensors. This condition arises on marine vessels which replace pumped fuel oil, such as JP-5, with sea water to provide ballast. Such a liquid level sensor system may be implemented by multiplexing several pressure sensors into a vertical array. It is appreciated that modern aircraft carriers include over 500 fuel tanks so that arrays of expensive pressure sensors would be prohibitively costly and, because conventional sensors would involve electricity, prohibitively dangerous.

Fiber optic sensors need not be electrical or metallic. The prior art, however, does not teach or suggest the use of an entirely satisfactory fiber optic sensor for the described purposes. Generally, three types of fiber optic sensors are known for measuring such parameters; viz, micro-bending sensors, interferometric sensors and polarization type sensors.

Fiber optic micro-bending sensors are designed to sense pressure by excluding light from the fiber in proportion to changes in pressure. The phenomenon is denoted as micro-bending loss. The output light intensity levels from such sensors diminish with increase in measured pressure as pressure is transduced into light loss. Since the accuracy of the measurement diminishes because of the lower light levels, the dynamic range of such sensors is severely limited. With the micro-bending sensor, changes in pressure are sensed by changes in output light levels. Such light level changes may also be caused by bending of the input or return cables and variations in source intensity caused by aging, power supply fluctuations or drift and the like. Such changes in output light levels are inseparable from changes in the measured parameter. These disadvantages also maintain when micro-bending sensors are utilized to sense temperature. The micro-bending sensor tends to be a delicate readily damaged sensor.

Interferometeric fiber optic sensors measure changes in pressure by applying pressure to an optical fiber changing the index of refraction thereof. This phenomenon results in a phase delay which is measured by utilizing a Mach-Zehnder or Michaelson interferometer configuration. Although interferometric sensors are extremely sensitive, they are also extremely expensive costing many thousands of dollars for each sensor. Thus, in applications requiring thousands of sensors, the interferometeric sensor approach would be prohibitively expensive. Such sensors are extremely complicated and difficult to utilize outside of a laboratory environment. Interferometric sensors utilized to measure temperature would also suffer from the same shortcomings. Interferometric sensors require sophisticated modulation techniques which render the sensors unsuitable for the described applications.

Polarization varying fiber optic sensors alter the polarization state of a polarized optical signal in accordance with a change in temperature or pressure. Such polarized light sensors require special optical fiber and expensive polarizing beamsplitters. Additionally, perturbations in input or output leads or in the source cannot be readily separated from true changes in temperature or pressure.

Additionally, fiber optic temperature sensors based on the temperature dependent emission spectra of rare earth phosphors are known in the art. Such sensors are excessively expensive and require very complicated electro-optical signal processing. Distributed temperature sensors are also known which measure the temperature dependent anti-Stokes Raman backscattering via optical time domain reflectometry. Such sensor configurations are extremely expensive and are only practical when a large number of distributed temperature measurements are required. Such a sensor approach is inappropriate where single point temperature measurements are required.

A variable ratio fiber optic coupler sensor is described in U.S. Pat. No. 4,634,858, issued Jan. 6, 1987 entitled "Variable Coupler Fiber Optic Sensor" by Gerdt et al and assigned to the assignee of the present invention. Said U.S. Pat. No. 4,634,858 is incorporated herein by reference. Although the sensor of said U.S. Pat. No. 4,634,858 provides numerous advantages over the sensors hereinabove described, the variable ratio fiber optic coupler sensor has not heretofore been utilized or configured to resolve the problems of the above-described applications.

SUMMARY OF THE INVENTION

The shortcomings of the prior art applications are overcome by utilizing an all optical, non-metallic variable ratio fiber optic coupler sensor for measuring temperature, pressure and liquid level in an environment subject to spark hazard, such as a fuel or gas tank. The invention includes various specific configurations of the sensor for detecting these parameters. Such configurations also have applicability in environments other than those subject to spark hazard.

DESCRIPTION OF THE PREFERRED EMBODIMENTS

The present invention utilizes the variable ratio fiber optic coupler sensor to sense various physical entities such as temperature, pressure and liquid level thereby utilizing only light-in and light-out, all optical methods. Compared to the other types of fiber optic sensors described above, the variable ratio fiber optic coupler sensor operates to separate input, output and source variations from the physical parameter being measured. Since the output of the sensor is a ratio, difference over sum processing may be utilized to eliminate or reduce external effects. Light is not lost as in the micro-bending sensor. Optical phase difference is unimportant so that interferometric sensors and sophisticated modulation techniques need not be utilized. The variable ratio coupler sensor provides a less ambiguous output, than the micro-bending sensor. As previously described, light level changes occur with the micro-bending sensor not only in response to changes in temperature or pressure, but for numerous other reasons. Since a ratio of output levels is detected in accordance with the measured parameter when utilizing the variable ratio coupler sensor, the sensed parameter such as temperature or pressure is isolated. Additionally, the light levels utilized are maintained relatively large. The total amount of light remains substantially constant.

In measuring liquid levels in tanks, several pressure sensors are mutiplexed into a vertical array preferably utilizing the multiplexing techniques described in U.S. patent application Ser. No. 465,717, filed Jan. 16, 1990, entitled "Apparatus and Method for Multiplexing Fiber Optic Sensors", by David W. Gerdt and assigned to the assignee of the present invention. Said Ser. No. 465,717 is incorporated herein by reference. Such a multiplexed vertical array of variable ratio fiber optic coupler sensors may be utilized to measure liquid levels of a plurality of unknown liquids.

The variable ratio coupler sensor can be inexpensively mass produced and requires unsophisticated electronics, simple sources such as lasers and light emitting diodes and simple and inexpensive materials such as optical fibers. The variable ratio coupler permits all optical transduction of temperature and pressure into corresponding light level ratios at the sensor outputs. Optical sensors eliminate electrical spark danger even if malfunction or damage at the sensing element occurs. The variable ratio fiber optic coupler sensor is readily mass producible compared to other all-optical systems. The variable ratio fiber optic coupler sensor provides single-point temperature and pressure measurements far less expensively than other fiber optical methods.

Figure 1A:
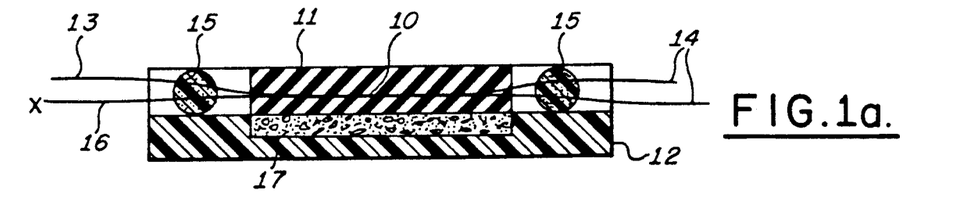
FIGS. 1a, 1b, 2a, 2b, 3a and 3b are sectional elevation views and plan views of variable ratio fiber optic coupler pressure sensors in accordance with the present invention.
Figure 1B:
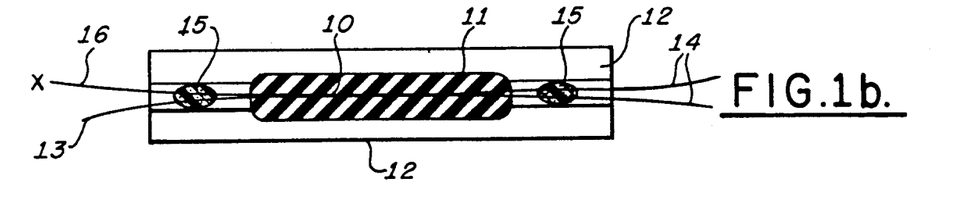

Referring to FIGS. 1a and 1b, a variable ratio fiber optic coupler pressure sensor in accordance with the present invention is illustrated. A coupler fusion joint 10 is encapsulated in a suitble elastic material 11 in a rigid housing 12. The material 11 may comprise relatively soft and pliable, room temperature vulcanizing silicon rubber such as GE RTV-12 or hard and rigid optical epoxies such as EPO-TEK 328. An input fiber 13 provides source light to the fusion joint 10 and output fibers 14 provide the optical output signals related to sensed pressure. Epoxy anchors 15 secure the optical fibers in the housing 12. An inactive input fiber 16 is illustrated for completeness.

Disposed between the elastic material 11, which forms a membrane, and the housing 12 is a layer 17 of compressible material, such as sponge or air, having a low modulus of compressibility. The surface of the membrane 11 opposite the layer 17 is exposed to the medium such as air, water, fuel or the like for which it is desired to measure a hydrostatic or dynamic pressure. Pressure changes in the environment to which the membrane 11 is exposed, result in corresponding deflections of the membrane with respect to the compressible layer 17 resulting in output signals from the fibers 14 related to the pressure changes.

Figure 2A:
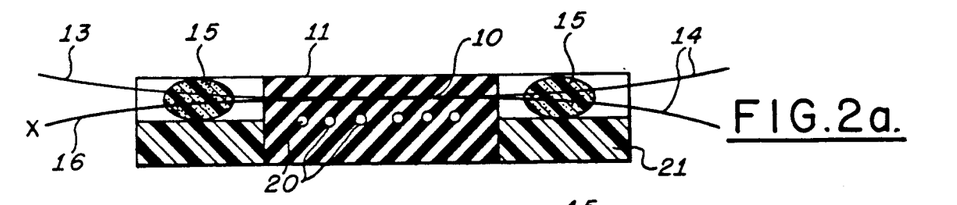
Figure 2B:
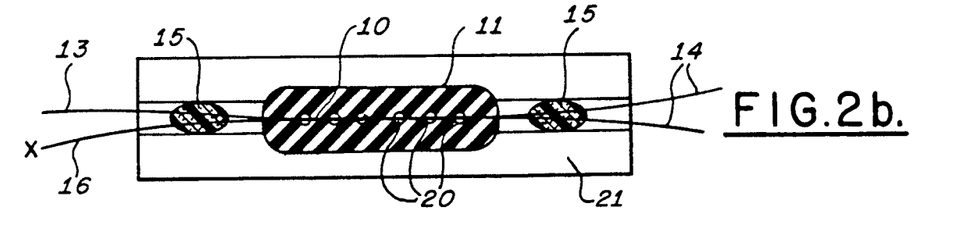

Referring to FIGS. 2a and 2b, in which like reference numerals indicate like elements with respect to FIG. 1, a further design for a variable ratio fiber optic coupler pressure sensor in accordance with the invention is illustrated. Similar to the sensor of FIG. 1, a compressible medium is disposed near the fused fiber coupling joint 10. In the embodiment of FIG. 2, compressibility is achieved by bubbles of air 20 injected into the encapsulant 11 by, for example, a hypodermic syringe. The sensor of FIG. 2 is contained in a housing 21.

The sensor of FIGS. 2a and 2b without the bubbles 20 is substantially incompressible. The encapsulant 11 such as RTV silicon rubber is approximately as incompresible as water. The bubbles of air 20 are, however, highly compressible and are illustrated in a line parallel to the fusion joint 10. It is appreciated that since the bubbles 20 are not uniformly distributed throughout the encapsulant 11, pressure changes result in directional distortion of the encapsulant 11 and therefore of the coupler joint 10 as the bubbles 20 contract and expand. Because of this, each sensor may require individual calibration depending on desired operational accuracy. The input fiber 13 provides input optical power to the coupling joint 10 and the output fibers 14 provide the output optical power signal conveying the pressure measurement information. Unlike the embodiment of FIGS. 1a and 1b, the membrane 11 is exposed on both surfaces not requiring enclosure of one of the surfaces in a well in the housing. The design of the sensor of FIGS. 2a and 2b tends to be simpler to construct than the sensor of FIGS. 1a and 1'b thereby resulting in lower production costs.

Figure 3A:
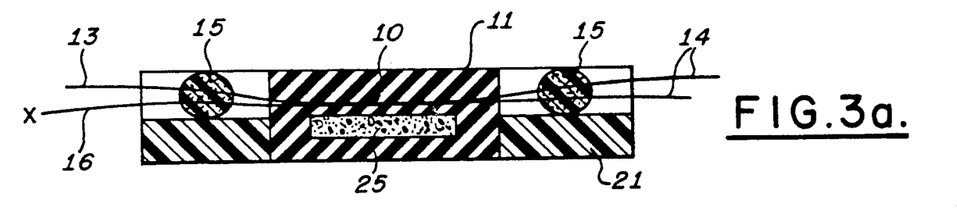
Figure 3B:
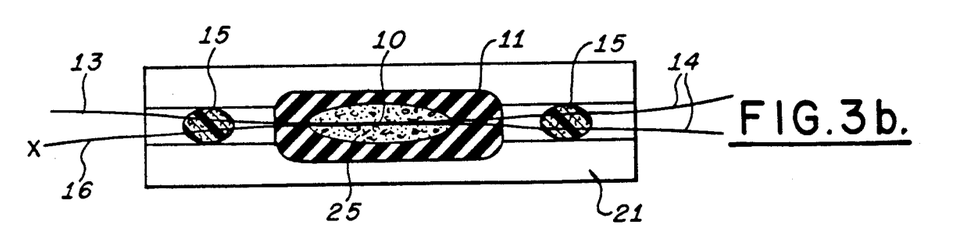

Referring to FIGS. 3a and 3b, in which like reference numerals indicate like components with respect to FIGS. 1a-2b, a further embodiment of a variable ratio fiber optic coupler pressure sensor is illustrated. The sensor of FIGS. 3a and 3b substantially the same as the sensor of FIGS. 2a and 2b except that a compressible material 25, with a low modulus of compressibility, such as sponge, is embedded in the encapsulant 11 near the coupler fusion joint 10. The elastic membrane 11 of FIGS. 3a and 3b, similar to that of FIGS. 2a and 2b, is exposed on both sides thereof to the medium with respect to which the pressure measurement is to be provided. Alternatively, with respect to the FIGS. 2a-3b embodiments, the sensor may be constructed such that only one side of the membrane 11 is exposed.

Figure 4A:
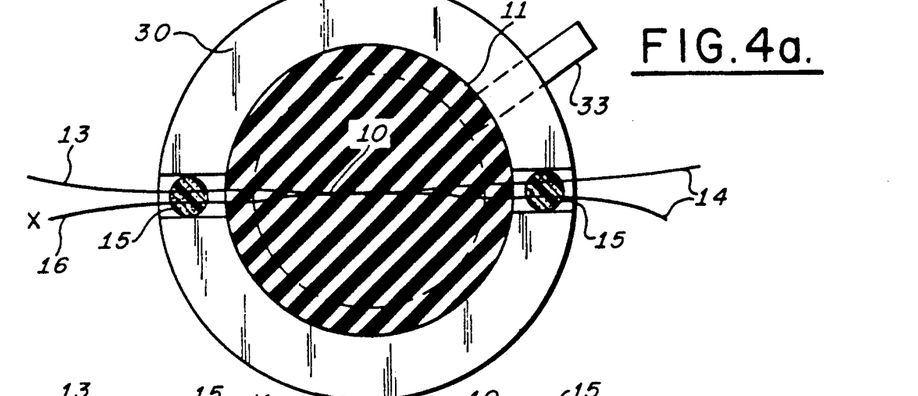
FIGS. 4a, 4b, 5a and 5b are sectional elevation views and plan views of variable ratio fiber optic coupler pressure sensors of a type different from those of FIGS. 1-3 in accordance with the present invention.
Figure 4B:
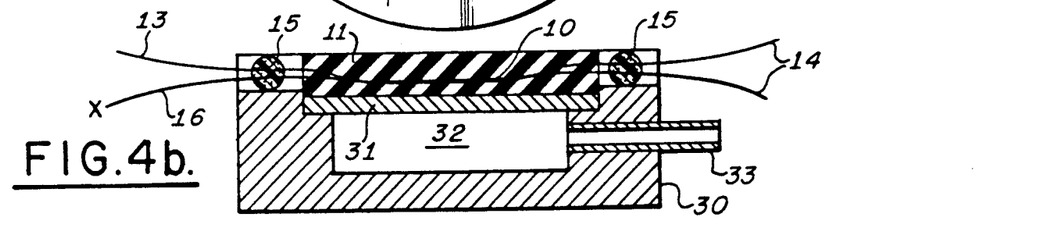

Referring to FIGS. 4a and 4b, in which like reference numerals indicate like components with respect to FIGS. 1a-3b, an alternative design of a variable ratio fiber optic coupler pressure sensor in accordance with the invention is illustrated. A housing 30 and a thin elastic membrane or plate 31 form a pressure load cell 32 with the membrane 11 of the coupler sensor securely affixed to the plate 31. The plate or diaphragm 31 is constructed of a suitable, elastically deformable material, such as metal or plastic, which responds elastically to pressure differences between the internal volume of the cell 32, which may contain entrapped air, and the environment of the sensor. The membrane 31 is constructed of a material and geometrically designed to provide a deflection range corresponding to the pressure range to which the sensor is designed to respond. The volume confined by the housing 30 may be preloaded to a predetermined pressure such as partial vacuum, atmospheric pressure or over pressure. The sensor is thereby preloaded to a predetermined reference pressure against which changes in pressure in the medium surrounding the sensor are measured.

Alternatively, the volume confined by the housing 30 may be connected to a reservoir (not shown) through a pressure feedthrough 33. Changes of pressure within the reservoir result in elastic deformations or deflections against the pressure, which may be normal atmospheric pressure, of the surrounding medium. Since the pressure cell 32 comrpises the elastically deformable diaphragm 31 supported on the rigid housing 30, pressure changes within the cell 32 result in proportional elastic deformations of the diaphragm 31. Since the encapsulant 11 of the coupler sensor is fastened directly to the membrane 31, the sensor is stressed in proportion to pressure changes resulting in a change in sensor output coupling ratio. The output ratio change provides a measure of the sensed pressure change. Thus, a predetermined pressure within the pressure cell 32 is directly related to a corresponding output ratio of the fiber optic coupler sensor affixed thereto. Positive and negative changes with respect to the predetermined pressure result in corresponding changes in the sensor output ratio.

Figure 5A:
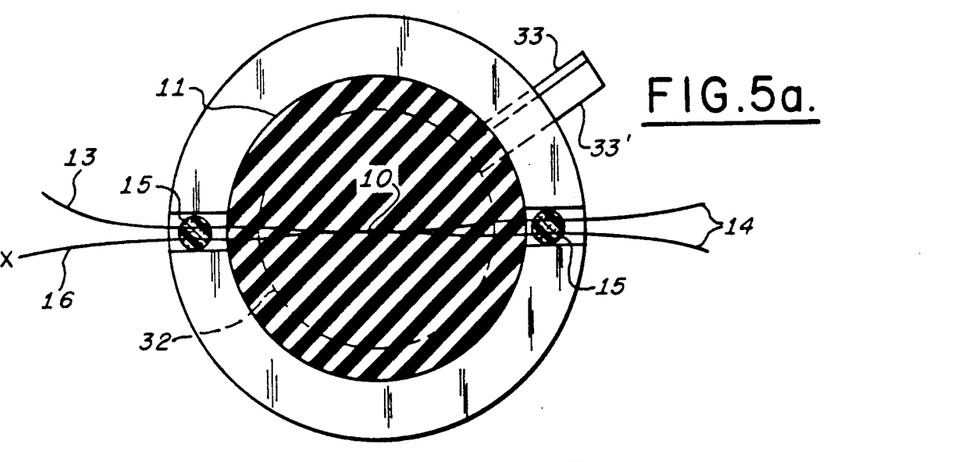
Figure 5B:
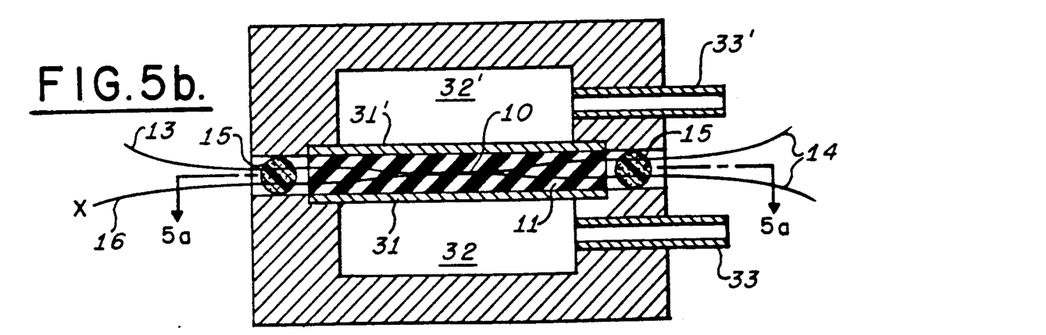

Referring to FIGS. 5a and 5b, in which like reference numerals indicate the same components with respect to FIGS. 1a-4b and primed reference numerals indicate similar elements with respect to FIGS. 4a and 4b, a variation of the pressure sensor of FIGS. 4a and 4b is illustrated. In the pressure sensor of FIGS. 5a and 5b, the encapsulant membrane 11, which may be thick or thin, is disposed between pressure reservoirs 32 and 32'. Elastic plates 31 and 31' may or may not be utilized in this embodiment. One of the reservoirs 32 or 32' is maintained at constant pressure thereby providing a pressure reference. Pressure changes in the other reservoir, either under pressure or over pressure, causes the membrane 11 to deflect away from the reservoir of higher presssure. The amount of deflection is determined by mechanical or physical design and is correlated to the change in pressure of the one reservoir with respect to the other. Thus, the output ratio of the variable ratio fiber optic coupler sensor disposed between the reservoirs varies in accordance with the relative pressures thereby providing a measure thereof. A variable ratio fiber optic coupler differential pressure sensor is implemented by permitting the pressure within both reservoirs 32 and 32' to vary.

Figure 6:
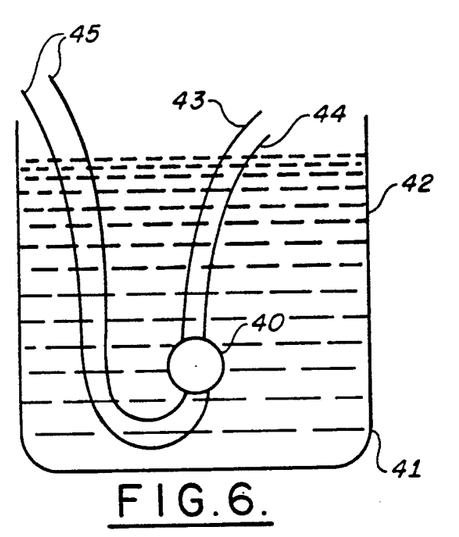
FIG. 6 is a schematic elevation view of a tank illustrating the variable ratio fiber optic coupler pressure sensor utilized as a tank liquid level indicator of known fluid.

As discussed above, the variable ratio fiber optic coupler pressure sensor of the types described above with respect to FIGS. 1a-5b may be utilized to determine the levels of liquids in tanks. Referring to FIG. 6, a single pressure sensor 40 disposed at the bottom of a tank 41 is utilized to measure the pressure head or level of liquid 42 in the tank 41. In the configuration of FIG. 6, the density of the liquid 42 must be known to determine the depth thereof in the tank 41. Known relationships are utilized to derive the liquid level from the density and pressure head thereof. The sensor 40 includes an input optical fiber 43 and an alternate input fiber 44 as well as output optical fibers 45 in a manner similar to that described above with respect to FIGS. 1a-5b.

Figure 7:
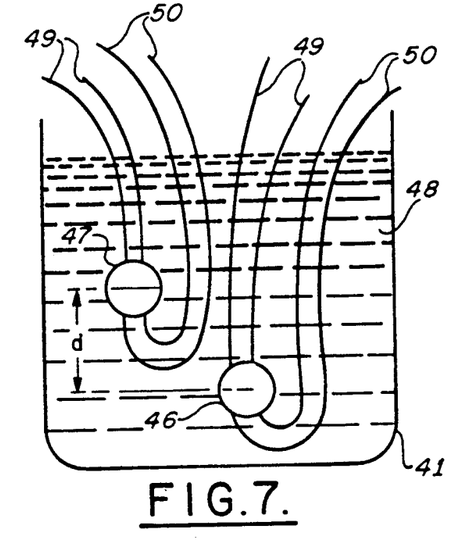
FIG. 7 is a schematic elevation view of a tank illustrating variable ratio fiber optic coupler pressure sensors utilized as a tank liquid level indicator of unknown fluid.

If the density of the liquid is unknown, but the liquid is otherwise isotropic (uniform), two pressure sensors separated by a known vertical distance are sufficient to measure the level or height of the liquid. Referring to FIG. 7, in which like reference numerals indicate like components with respect to FIG. 6, pressure sensor 46 and 47 separated by a distance d are utilized to determine the height of a liquid 48 of unknown density in the tank 41. By known relationships, the density of the liquid 48 is determined utilizing the distance of separation d and then the liquid level height is computed. Each of the sensors 46 and 47 include input optical fibers 49 and output optical fibers 50 in the manner described above with respect to FIG. 6.

Figure 8:
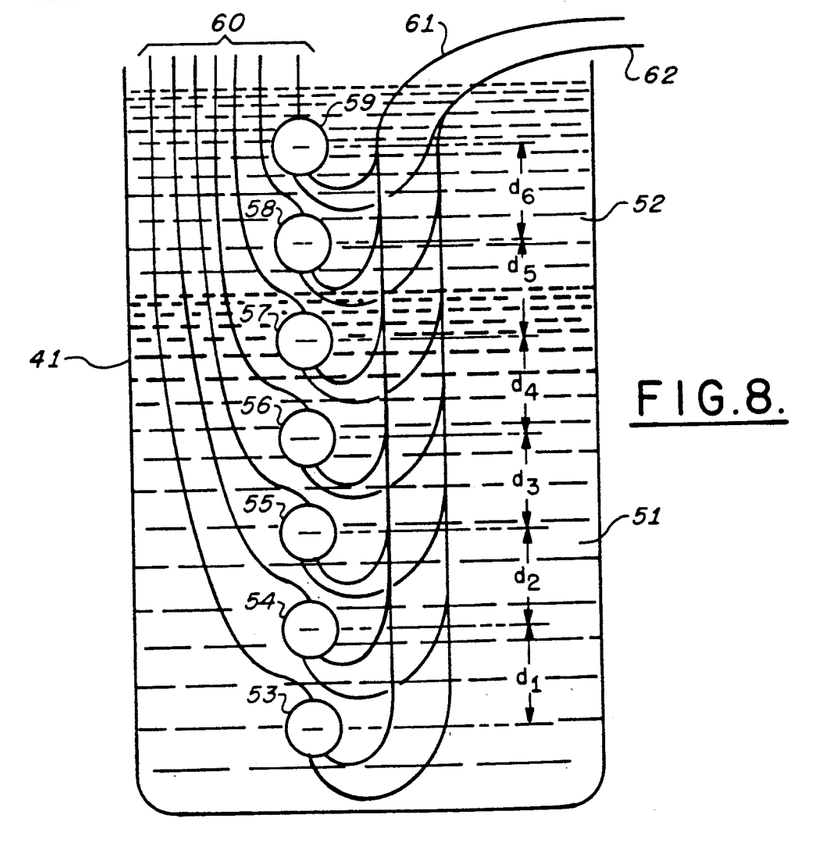
FIG. 8 is a schematic elevation view of a tank illustrating variable ratio fiber optic coupler pressure sensors utilized in a multiplexed fashion as a tank liquid level indicator of unknown fluids.

Referring to FIG. 8, in which like reference numerals indicate like components with respect to FIGS. 6 and 7, a vertical string or array of pressure sensors separated by known distances is utilized to determine the levels of a plurality of different immiscible liquids of unknown densities in a tank 41. FIG. 8 is exemplified with a heavier liquid 51, such as fuel oil, and a lighter liquid 52, such as salt water floating on the liquid 51. Pressure sensors 53-59 separated by distances $d_1-d_6$ determine the density and levels of the liquids 51 and 52 by known relationships. The sensors 53-59 are provided with respective input optical fibers 60. The output optical fibers from the sensors 53-59 are tapped into multiplexed trunks 61 and 62, respectively. By utilizing the fiber optic multiplexing techniques described in said Ser. No. 465,717, the array of pressure sensors 53-59 may be optically powered by a single source and the output signals on the trunks 61 and 62 may be processed by a single output detector.

The variable ratio fiber optic coupler is adaptable in a plurality of embodiments to provide a temperature sensor. Several of the embodiments utilize an extrinsic design in that the temperature transducing mechanism is external to the encapsulant of the sensor. Several other designs are intrinsic in that the transducing mechanism is disposed within the encapsulant. In all of the described embodiments, a mechanism near the coupling joint changes physical dimension in response to changes in temperature. The physical dimensional changes of the mechanism are coupled either directly or through an elastic boundary layer to the coupler joint causing strain in the encapsulant in the vicinity of the joint. The resulting strain causes a variation in the coupling ratio output of the sensor. In this manner, variations in temperature result in corresponding changes in coupling output ratio, thus providing a fiber optic temperature gauge.

Figure 9:
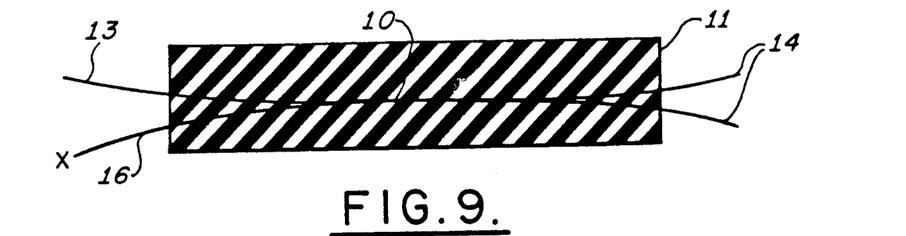
FIGS. 9, 10, 11, 12 and 13 are sectional elevation views of variable ratio fiber optic coupler temperature sensors in accordance with the present invention.

Referring to FIG. 9, in which like reference numerals indicate like components with respect to the previously described figures, a variable ratio fiber optic coupler temperature sensor in accordance with the invention is illustrated. The temperature sensor of FIG. 9 is predicated on the phenomenon that the basic encapsulated sensor as illustrated exhibits an intrinsic temperature sensing property. This is caused either by a difference in the thermal coefficients of expansion of the optical fibers and the encapsulant 11 or the observation that all materials exhibit a temperature dependent index of refraction. RTV materials have thermal coefficients of expansion of approximately ten times that a quartz optical fibers. The encapsulant 11 may additionally be doped with another material to increase or decrease the coefficient of thermal expansion difference thereby increasing or decreasing the temperature sensitivity of the sensor, respectively.

The sensor of FIG. 9 utilizes the intrinsic temperature sensitivity of the basic coupler without utilizing force amplification coupled to the membrane 11 to amplify the force resulting from temperature changes. The following modifications could, however, be utilized to increase sensor sensitivity: the coupling region could be significantly lengthened; stable high gain D.C. amplifiers could track the intrinsic sensitivity; or high gain A.C. amplifiers could be used in a lock-in type phase detection where the input light is modulated.

Figure 10:
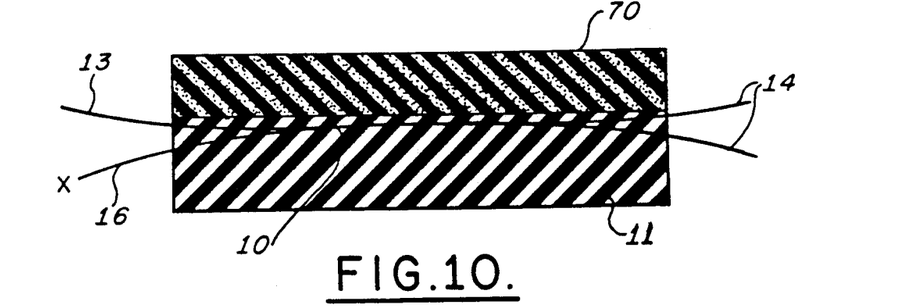

Referring to FIG. 10, in which like reference numerals indicate like components with respect to FIG. 9, a further embodiment of a variable ratio fiber optic coupler temperature sensor in accordance with the invention is illustrated. A layer of material 70 having a different coefficient of thermal expansion than the encapsulant layer 11 is disposed in intimate contact with the layer 11. The coupler fusion joint 10 is disposed in the layer 11. Temperature variations induce a bending moment in the layers 11 and 70 resulting in a variation in the sensor coupling ratio. The layer 11 may be pure RTV material while the layer 70 may comprise RTV rubber filled with a material of high thermal coefficient of expansion. It is appreciated that the bi-encapsulant mechanism functions as a force amplifier to amplify the temperature transductional force.

Figure 11:
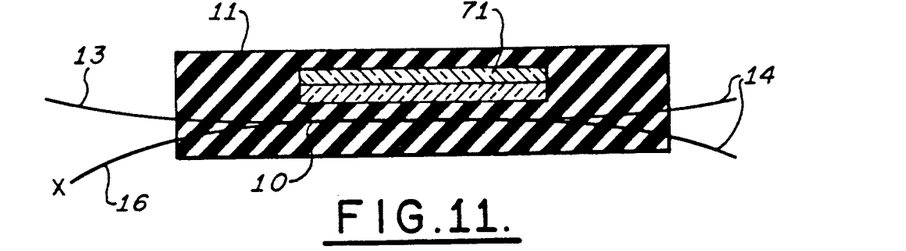

Referring to FIG. 11, in which like reference numerals indicate like elements with respect to FIG. 9, a further embodiment of a variable ratio fiber optic coupler temperature sensor in accordance with the invention is illustrated. A bi-metallic element 71, in the form of a strip or disk is encapsulated in the layer 11 near the coupler fusion joint 10. Bending of the element 71 in response to tempearature variations stresses the layer 11 at the joint 10 thereby providing a coupling ratio that varies in accordance with the temperature. Since the membrane 11 can be made very thin, a fast temperature response should result. A completely non-metallic sensor can be constructed by substituting, for the bi-metallic element 71, an element comprising two thin layers of glass bonded together having different coefficients of thermal expansion. The glass element 71 may be in the form of a disk or strip with the glass layers bonded together by a conventional glass fusion operation.

Figure 12:
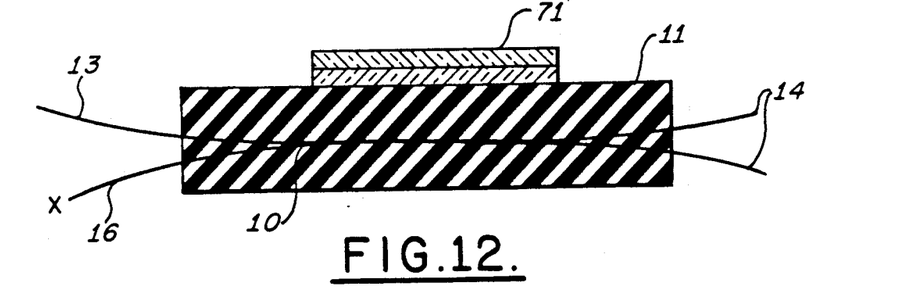

Referring to FIG. 12, in which like reference numerals indicate like components with respect to FIG. 11, a further embodiment of a variable ratio fiber optic coupler temperature sensor in accordance with the invention is illustrated. The embodiment of FIG. 12 is similar to that of FIG. 11 except that the temperature sensitive element 71 is disposed external to the elastic medium 11. It is appreciated with respect to FIGS. 11 and 12 that the element 71 functions as a force amplifier.

Figure 13:
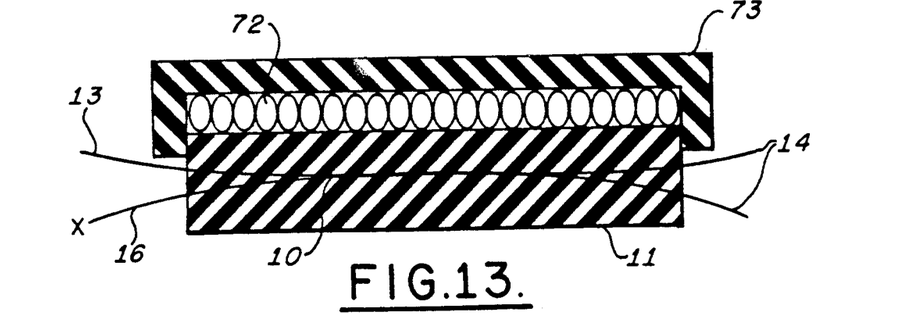

Referring to FIG. 13, in which like reference numerals indicate like components with respect to FIG. 12, a further embodiment of a variable ratio fiber optic coupler temperature sensor in accordance with the invention is illustrated. A layer of nematic liquid crystal 72 is constrained in a rigid cavity formed by a housing 73 and the RTV elastomer layer 11. The cavity is rigidly enclosed except on the side where there is intimate contact with the membrane 11. The other side of the membrane 11 is exposed to the environment. The liquid crystal 72 when properly aligned functions as a plurality of temperature sensitive springs. As the temperature of the sensor changes, dimensional changes occur in the liquid crystal layer 72 which stresses the membrane 11. Movement of the membrane 11 results in a change in the output ratio of the coupler. The liquid crystal springs significantly extend in response to temperature increase deforming the membrane 11 and changing the coupling ratio.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A fiber optic coupler pressure sensor comprising a housing having an aperture therein,
   a fiber optic coupler encapsulated in said aperture having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers,
   encapsulant material for encapsulating said common optical core in said aperture, said encapsulant material having a refractive index variable with stress applied thereto, such that said incident light energy is distributed between said plurality of output optical fibers as a function of stress applied to said encapsulant material, and
   compressible means cooperative with said encapsulant material so that pressure applied to said encapsulant material compresses said compressible means, so as to create stress in said encapsulant material in accordance with said applied pressure.

2. The sensor of claim 1 wherein said compressible means comprises a layer of compressible material disposed between said encapsulant material and said housing.

3. The sensor of claim 1 wherein said compressible means comprises air bubbles injected into said encapsulant material proximate said common optical core.

4. The sensor of claim 1 wherein said compressible means comprises compressible material encapsulated in said encapsulant material proximate said common optical core.

5. A fiber optic coupler pressure sensor comprising
   a housing,
   a pressure cell within said housing, bounded by said housing on three sides and by an elastic member deformable in accordance with pressure applied to said cell on a fourth side,
   a fiber optic coupler having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers, and
   encapsulant material encapsulating said common optical core, said encapsulating material exposed to environmental pressure on one side and coupled to said elastic member on a side opposite said one side, said encapsulant material having a refractive index variable with stress applied thereto, such that said incident light energy is distributed between said plurality of output optical fibers as a function of stress applied to said encapsulant material,
   said stress generated by deflections of said elastic member in response to pressure differences between said pressure cell and said environmental pressure.

6. A fiber optic coupler pressure sensor comprising first and second pressure reservoirs, and
   a fiber optic coupler sensor having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers, said common optical core being encapsulated in a membrane formed of encapsulant material having a refractive index variable with stress applied thereto such that said incident light energy is distributed between said plurality of output optical fibers as a function of stress applied to said membrane,
   said membrane being positioned between said first and second pressure reservoirs so that said membrane is deflected in accordance with pressures within said first and second reservoirs, said stress being generated in said encapsulant material in accordance with said pressures.

7. A fiber optic coupler temperature sensor comprising
   a fiber optic coupler having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers,
   a layer of encapsulant material for encapsulating said common optical core, said encapsulant material having a refractive index variable with stress applied thereto, such that said incident light energy is distributed between said plurality of output optical fibers as a function of stress applied to said encapsulant material, and
   a layer of further material fastened to said layer of encapsulant material, said further material and said encapsulant material having substantially different coefficients of thermal expansion with respect to each other so that temperature changes cause said layers to bend, so as to apply stress to said encapsulant material in accordance with said temperature changes.

8. A fiber optic coupler temperature sensor comprising
   a fiber optic coupler having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers,
   a layer of encapsulant material encapsulating said common optical core, said encapsulant material having a refractive index variable with stress applied thereto, such that said incident light energy is distributed between said plurality of output optical fibers as a function of stress applied to said encapsulant material, and
   a temperature responsive element cooperative with said layer of encapsulant material, said temperature responsive element changing shape in response to temperature variations, so as to apply stress to said encapsulant material in accordance with said temperature variations.

9. The temperature sensor of claim 8 wherein said temperature responsive element comprises a bi-metallic element fastened to a surface of said layer of encapsulant material.

10. The temperature sensor of claim 8 wherein said temperature responsive element comprises a bi-metallic element encapsulated in said encapsulant material.

11. The temperature sensor of claim 8 wherein said temperature responsive element comprises two bonded together layers of glass having different coefficients of thermal expansion with respect to each other fastened to a surface of said layer of encapsulant material.

12. The temperature sensor of claim 8 wherein said temperature responsive element comprises two bonded together layers of glass having different coefficients of thermal expansion with respect to each other encapsulated in said encapsulant material.

13. A fiber optic coupler temperature sensor comprising
   a housing,
   a fiber optic coupler having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers,
   a layer of encapsulant material encapsulating said common optical core, said encapsulant material having a refractive index variable with stress applied thereto, such that said incident light energy is distributed between said plurality of output optical fibers as a function of stress applied to said encapsulant material, said layer of encapsulant material being disposed in said housing to form a cavity with respect to said housing, and a layer of nematic liquid crystal material in said cavity having molecules appropriately oriented to stress said encapsulant material when said molecules change dimension in response to temperature changes, said stress in said encapsulating material thereby being generated in response to temperature changes.

14. A method of sensing temperature utilizing a fiber optic coupler sensor having a plurality of input optical fibers each having a core, said cores of said optical fibers being merged and fused in a waist region to form a common optical core wherefrom a plurality of output optical fibers emerge, said fiber optic coupler distributing light energy incident to one of said input optical fibers between said plurality of output optical fibers, said waist region being encapsulated in an encapsulant material having a refractive index variable with stress applied thereto such that said incident light energy is distributed between said plurality of output optical fibers as a function of stress applied to said encapsulating material, said optical fibers and said encapsulant material having substantially different coefficients of thermal expansion with respect to each other; comprising the steps of:

positioning said fiber optic coupler sensor to sense said temperature, said stress being generated in said encapsulant material by said different coefficients of thermal expansion in response to changes in said temperature, and converting said distributed light energy emerging from said output optical fibers into corresponding electrical signals, thereby sensing said temperature changes.

* * * * *